May 20, 1958  K. A. SCHMULDT  2,835,282
RECIPROCATING WIRE-BENDING DEVICE
FOR FORMING COMPLEX BENDS
Filed May 7, 1953
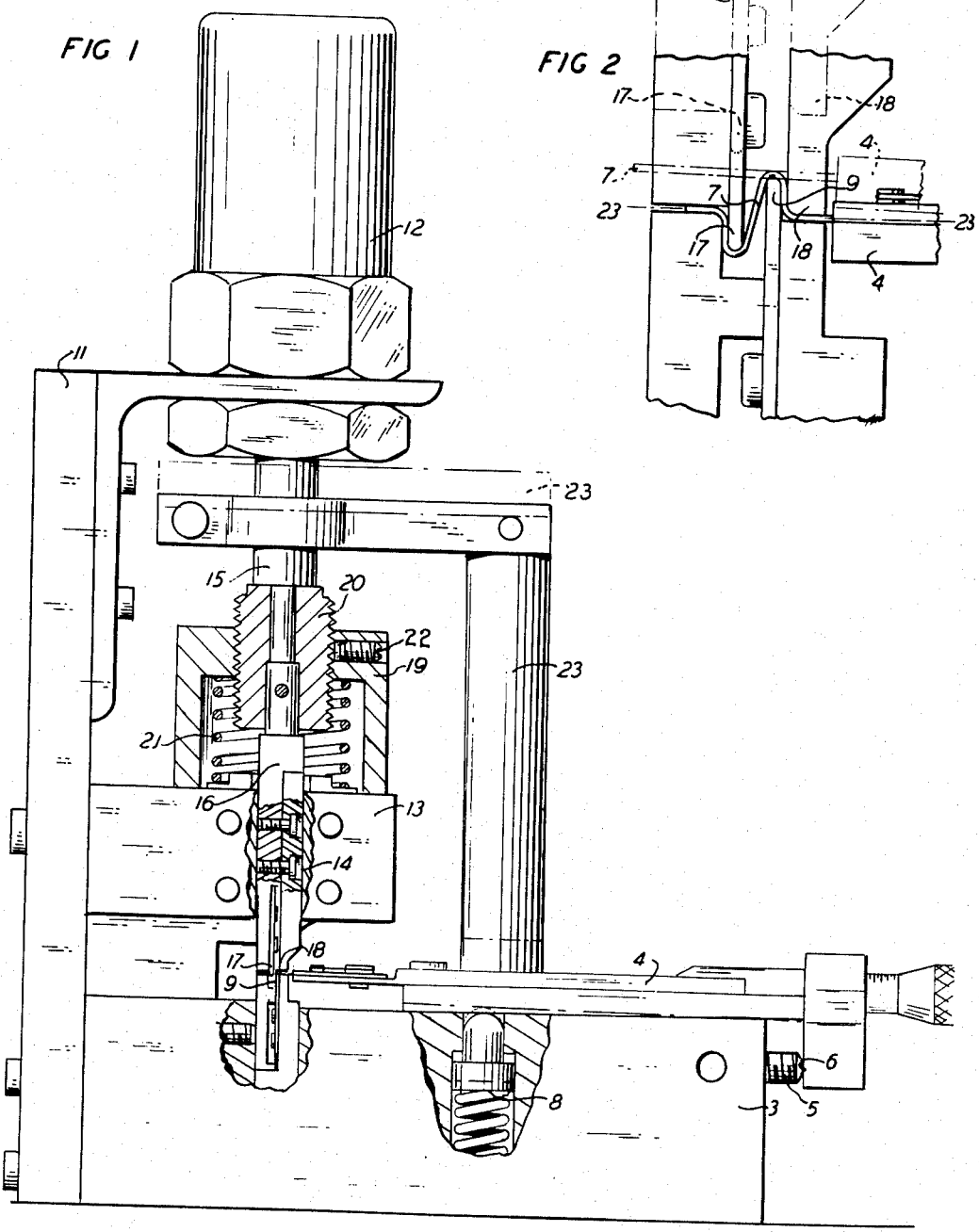
INVENTOR
K. A. SCHMULDT
BY
[signature]
ATTORNEY

2,835,282

RECIPROCATING WIRE-BENDING DEVICE FOR FORMING COMPLEX BENDS

Karl A. Schmuldt, Emmaus, Pa., assignor to Western Electric Company, Incorporated, New York, N. Y., a corporation of New York Application May 7, 1953, Serial No. 353,506

6 Claims. (Cl. 140—105)

This invention relates to forming devices and particularly to fixtures for forming wires to a particular shape with a high degree of uniformity.

This problem arises for example in the manufacture of point contact type transistors in which the collector and emitter wires have accurately formed S bends which are compressed to provide pressure contact between the points and germanium wafer.

The general object of this invention is a device which is capable of forming such bends quickly and at low cost.

According to the general features of the invention, this object is attained by providing a fixture having means for positioning the holder in which the wires are held so that the holder is resiliently supported in an inclined position with the wires extending therefrom resting on a fixed forming member. A furcated tool is driven down to form the wires against the fixed forming members and an arm, moving with the tool, simultaneously forces the holder into horizontal position while the S bends are being formed.

By moving the wire holder in this way while the bends are being formed, it is possible to form the wires to any desired shape with only a single movable forming tool, thereby greatly simplifying the design and reducing the cost of the fixture.

These and other features of the invention will be more fully understood from the following detailed description taken in conjunction with the accompanying drawing in which:

Fig. 1 is a side elevational view partially in section of an S bend forming fixture according to the invention; and Fig. 2 is an enlarged view of a portion of Fig. 1 showing the operated and non-operated positions of the forming tool.

Referring now to the drawing, the forming fixture is provided with a base member 3 having a slot in the top surface thereof for receiving a wire holder 4 of the type disclosed in applicant's Patent No. 2,688,267 which issued September 7, 1954. An adjustable stop member 5 is provided at the end of the base 3 for engaging a corresponding stop member 6 on the holder 4 for positioning the holder 4 in the forming fixture so that the wires 7, loaded in the holder, will be in the prescribed work area. The resilient spring mechanism 8 in the base 3 supports the holder 4 in an initially inclined position, as shown in phantom, so that the wires 7 extend along the top of the fixed forming member 9 which is secured in the base.

The frame 11, which is attached to the base 3, supports a single acting air cylinder 12 having a reciprocating output shaft 15 which actuates the movable tool 16 which is provided with forming members 17 and 18 on the end thereof. This movable tool 16 slides in a square guideway 14 (shown in the broken section of Fig. 1) of the housing 13 which is also mounted on the frame 11. The bell shaped member 19, secured to detail 20, which in turn is pinned to the movable tool 16, acts as a housing for the spring 21 which is compressed against the guideway housing 13 during the down stroke of the tool 16 and retracts the forming tool 16 when the shaft 15 of the air cylinder is withdrawn. The downward travel of the forming tool may be adjusted by changing the position of detail 20 in the bell shaped member 19, a set screw 22 being provided to lock the two together.

The air cylinder shaft 15 is provided with a phenol fiber push rod 23 which moves down with a downward stroke of the air cylinder and bears on the top of the wire holder against the resilient mechanism 8, until the holder lies flat in the slot provided therefor in the base of the fixture. By moving the wire holder down simultaneously with the forming of the S bend in the wires, half of the S bend is produced above the axial centerline 23—23 of the wire leads, while the motion of the movable forming member 17 below this axial line produces the lower half of the bend.

In operation, the loaded wire holder is inserted into position against the stop in the base member, air is applied to the cylinder (i. e. through a solenoid controlled valve), its shaft moves down carrying with it the push down member to force the holder down on the base, while at the same time, the movable tool is pushed down, the forming details thereof engaging the wires on the opposite sides of the fixed forming member 9, thereby forming the S bend in the wires as shown in Fig. 2. At the completion of the downward stroke, the air cylinder is de-actuated, retracting its shaft and the hold down member attached thereto, the spring compressed against the guideway housing thereupon retracts the forming tool. The wire holder is then removed and the next inserted.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A device for forming bends in wire leads secured in a holder and extending therefrom comprising a base having fixed forming members mounted thereon, at least one of which protrudes therefrom and having means for resiliently supporting the holder whereby the wires extending from the holder are positioned over the fixed forming members, a forming tool slidably mounted above the fixed forming members, means for actuating the tool to form the wires on the fixed members and means attached to the tool actuating means for producing relative motion between the holder and the fixed forming members while the wire leads are being formed.

2. A device for forming bends in wire leads secured in a holder and extending therefrom comprising a base having fixed forming members mounted thereon, with at least one protruding therefrom and having means for resiliently supporting the holder whereby the wires extending from the holder are positioned over the fixed forming members, a forming tool slidably mounted above the fixed forming members, means for actuating the tool to form the wires on the fixed members and means attached to the tool actuating means for moving the holder down with respect to the fixed members while the movable tool forms the wires over the fixed members.

3. A device for forming bends in wire leads secured in a holder and extending therefrom comprising a base, fixed forming members mounted on the base, at least one of said members protruding from the base, means on the base for resiliently supporting the holder with a wire lead projecting over the members in alignment with the holder, a forming tool, means for actuating the tool to form the wire over the members and means moving with the tool for simultaneously moving the holder to maintain the alignment of the wires.

4. A device for forming bends in wire leads secured in a holder and extending therefrom comprising a base, fixed forming members mounted on the base with at least one protruding therefrom, means on the base for resiliently supporting the holder with a wire lead projecting over the members in alignment with the holder, a forming tool supported on the base above the members and fluid operated means for simultaneously moving the tool and the holder with respect to the members to form a compound bend in the aligned wire.

5. A fixture for forming S shaped bends in wires secured in a holder and extending therefrom comprising a base, fixed forming members on the base, one of which protrudes therefrom, a tool movable toward and away from the base and having forming members thereon co-operative with and opposing the fixed forming members, at least two of the members on the tool being spaced apart to receive the protruding fixed member therebetween when the tool is moved toward the base, the forming members being proportioned to produce an S shaped bend in a wire positioned therebetween when the tool is moved toward the base, means on the base for resiliently supporting the holder so that the wires extending therefrom are positioned between the opposing fixed and movable forming members, means for actuating the tool to form the wires between the opposing members and means movable with the tool for moving the holder against the base for producing relative motion between the holder and the fixed forming members when the wires are formed.

6. A device for forming complex bends in wires secured in a holder and extending therefrom comprising a base having fixed forming members mounted thereon, one of which protrudes therefrom, means on the base for resiliently supporting the holder in an inclined position whereby the wires extending from the holder are positioned over the fixed forming members, a tool, normally located in a retracted position, above the fixed forming members, said tool being movable between the retracted position and an advanced, wire-forming position, at least two forming members on the tool spaced to receive the protruding fixed member therebetween when the tool is advanced to the wire-forming position, an actuator for advancing the tool down to the wire-forming position to form the wires over the fixed members, and means operated with the actuator for simultaneously moving the holder down against the resilient support to a predetermined position on the base when the tool is advanced.

References Cited in the file of this patent

UNITED STATES PATENTS

| | | |
|---|---|---|
| 190,265 | Woodbury et al. | May 1, 1877 |
| 1,275,926 | Hughes | Aug. 13, 1918 |
| 1,800,012 | Foulke | Apr. 7, 1931 |

FOREIGN PATENTS

| | | |
|---|---|---|
| 4,239 | Germany | Mar. 7, 1879 |